B. W. CHRISTIAN.
TOOL.
APPLICATION FILED APR. 6, 1920.

1,424,001.

Patented July 25, 1922.

Inventor
B. W. Christian

By D. Swift
his

UNITED STATES PATENT OFFICE.

BERT W. CHRISTIAN, OF DELAVAN, WISCONSIN.

TOOL.

1,424,001. Specification of Letters Patent. Patented July 25, 1922.

Application filed April 6, 1920. Serial No. 371,641.

*To all whom it may concern:*

Be it known that I, BERT W. CHRISTIAN, a citizen of the United States, residing at Delavan, in the county of Walworth, State of Wisconsin, have invented a new and useful Tool; and I do hereby declare the following to be a full, clear, and exact description of the invention, such as will enable others skilled in the art to which it appertains to make and use the same.

The invention relates to tools and has for its object to provide a tool particularly adapted for use in cutting out and dislodging deposits, such as lime from traps of closet bowls. In certain localities where there is a large percentage of lime in the water, it has been found that deposits of the lime accumulate in the trap of the bowl, thereby in time materially reducing size of the trap chamber and consequently reducing the flowing of the water through the trap during a flushing operation. It has been common practice in these localities for plumbers to dig out this deposit with jack knives, screw drivers or such tools as are at hand and also cut the same from the trap by the use of muriatic acid. This process has been found to be extremely slow and at the same time the reaching of all points of the passage of the trap has been found to be extremely difficult, therefore it is a further object of the invention to provide an S shaped tool, one end of which is provided with a transversely disposed cutting edge and the other end with a vertically disposed cutting edge, each end serving as a cutting implement for digging out the deposit in the trap while the opposite end serves as a handle so that the end disposed within a trap may be moved during a chopping operation.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 1:
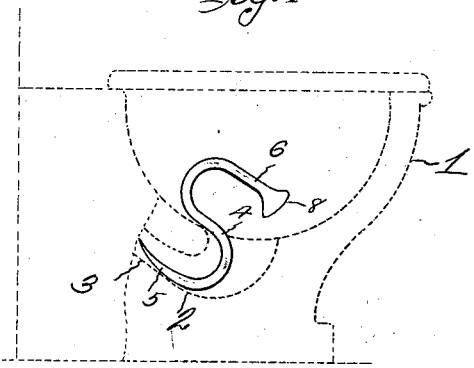
Figure 1 is a side elevation of the tool showing the same in position for use.
Figure 2:
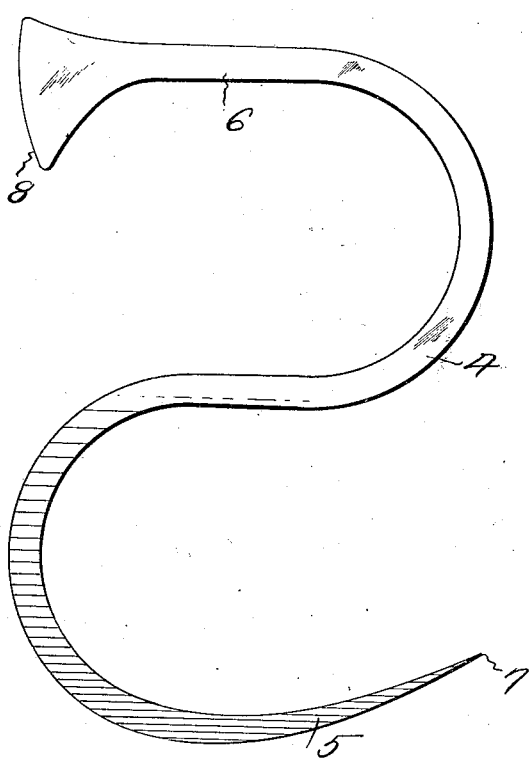
Figure 2 is an enlarged side elevation of the tool.
Figure 3:
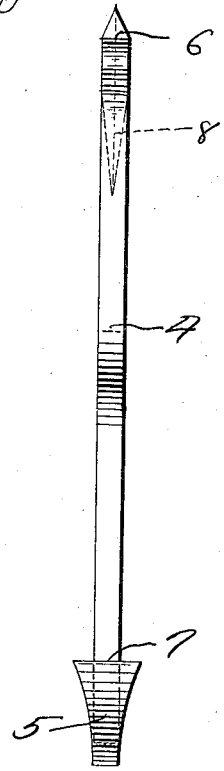
Figure 3 is an edge view of the tool.

Referring to the drawings, the numeral 1 designates a conventional form of closet bowl and 2 the trap thereof. The trap 2 becomes coated and filled with a deposit of lime from the water. When this happens it it extremely difficult to dislodge the same especially from the passage 3. To reach the passage 3 an S shaped tool 4 is provided, the ends 5 and 6 being oppositely disposed so that either end may be passed into the passage 3 of the trap while the operator grasps the other end so that a digging or chipping action may be imparted to the portion disposed in the passage 3 for dislodging and removing the deposit therein. The portion 5 is provided with a transversely disposed portion 7 which may be utilized for chipping or digging especially from the bottom of the passage, while the portion 6 is provided with a vertically disposed cutting edge 8 which may be utilized for digging and chipping the solidified lime from the sides of the passage. It is to be understood that the tool may be used for other purposes, however it is particularly adapted for digging out traps, of various kinds particularly the kind of type used in closet bowls.

From the above it will be seen that a tool is provided which may be utilized for digging out the lime in closet bowl traps and one wherein a digging or chipping action may be easily imparted to that portion of the tool disposed within the trap passage.

The invention having been set forth what is claimed as new and useful is:—

1. A trap clean out tool comprising a rigid S shaped member, the arms of said member extending in opposite directions in the same plane, cutting edges carried by the ends of said arms, said arms forming hand grips whereby the tool may be oscillated in a trap passage when the opposite arm is disposed in said trap passage.

2. A trap clean out tool comprising a flat rigid S shaped member, the arms of said member extending in opposite directions and substantially parallel to each other and in the same plane, one of said arms being provided with a cutting edge at right angles to a cutting edge carried by the other arm, said arms forming a hand grip whereby the tool as a whole may be oscillated when the opposite arm is disposed in a passage of a trap.

In testimony whereof I have signed my name to this specification in the presence of two subscribing witnesses.

BERT W. CHRISTIAN.

Witnesses:
J. J. KEMMETT,
DARWIN F. GREGORY.